United States Patent
Tulkki

(10) Patent No.: US 8,665,318 B2
(45) Date of Patent: *Mar. 4, 2014

(54) DIGITAL VIDEO CODING

(75) Inventor: Jarno Tulkki, Kempele (FI)

(73) Assignee: Google Inc., Mountain View, CA (US)

( * ) Notice: Subject to any disclaimer, the term of this patent is extended or adjusted under 35 U.S.C. 154(b) by 973 days.

This patent is subject to a terminal disclaimer.

(21) Appl. No.: 12/724,497

(22) Filed: Mar. 16, 2010

(65) Prior Publication Data

US 2010/0238268 A1   Sep. 23, 2010

(30) Foreign Application Priority Data

Mar. 17, 2009  (FI) .................................... 20095273

(51) Int. Cl.
*H04N 13/00* (2006.01)
*H04N 15/00* (2006.01)

(52) U.S. Cl.
CPC ................................. *H04N 13/0055* (2013.01)
USPC .......................................................... 348/43

(58) Field of Classification Search
None
See application file for complete search history.

(56) References Cited

U.S. PATENT DOCUMENTS

| | | |
|---|---|---|
| 5,537,155 A | 7/1996 | O'Connell et al. |
| 5,675,384 A | 10/1997 | Ramamurthy |
| 5,719,642 A | 2/1998 | Lee |
| 6,141,053 A | 10/2000 | Saukkonen |
| 6,236,682 B1 | 5/2001 | Ota et al. |
| 6,324,540 B1 | 11/2001 | Khanna |
| 6,330,344 B1 | 12/2001 | Kondo |
| 6,385,245 B1 | 5/2002 | De Haan |
| 6,404,738 B1 | 6/2002 | Reininger et al. |
| 6,411,602 B2 | 6/2002 | Schoenblum et al. |
| 6,449,312 B1 | 9/2002 | Zhang et al. |
| 6,456,591 B1 | 9/2002 | Mishra |
| 6,483,874 B1 | 11/2002 | Panusopone et al. |
| 6,535,238 B1 | 3/2003 | Kressin |

(Continued)

FOREIGN PATENT DOCUMENTS

| | | |
|---|---|---|
| EP | 0806866 A2 | 11/1997 |
| EP | 1578116 | 9/2005 |

(Continued)

OTHER PUBLICATIONS

Jang, C. Cho, H.-G., 'Automated Digital Photo Classification by Tessellated Unit Block Alignment', Proceedings of the International Conference on Convergence and Hybrid Information Technology 2008 (ICHIT 2008), Aug. 28-29, 2008, pp. 204 to 210, Daejon, South Korea, XP 031319705.

(Continued)

*Primary Examiner* — Nhon Diep

(74) *Attorney, Agent, or Firm* — Young Basile, Hanlon & MacFarlane P.C.

(57) ABSTRACT

Analysis of digitally encoded videos is disclosed. A method comprises: calculating pixelwise errors between each block and its search area that are mapped to an equal size; collecting the errors into a memory; and analyzing a three-dimensional surface formed by the errors collected into the memory in order to define a level of detail in the first digital image and/or in the second digital image, and/or a correspondence between the first digital image and the second digital image, and/or a motion extending beyond borders of the first digital image and the second digital image, and/or a motion blur within the first digital image and/or within the second digital image.

8 Claims, 8 Drawing Sheets

(56) References Cited

U.S. PATENT DOCUMENTS

| | | |
|---|---|---|
| 6,700,934 B2 | 3/2004 | Lin |
| 6,721,327 B1 | 4/2004 | Ekudden |
| 6,771,703 B1 | 8/2004 | Oguz et al. |
| 6,937,770 B1 | 8/2005 | Oguz et al. |
| 7,010,037 B2 | 3/2006 | Ye et al. |
| 7,065,004 B2 * | 6/2006 | Jiao et al. ............. 367/51 |
| 7,450,640 B2 | 11/2008 | Kim et al. |
| 7,584,475 B1 | 9/2009 | Lightstone et al. |
| 7,997,953 B2 * | 8/2011 | Kamiya et al. ............ 451/5 |
| 2002/0009149 A1 | 1/2002 | Rodriguez |
| 2002/0039386 A1 | 4/2002 | Han et al. |
| 2002/0146071 A1 | 10/2002 | Liu |
| 2002/0159525 A1 | 10/2002 | Yeong |
| 2003/0007566 A1 | 1/2003 | Peng |
| 2006/0062481 A1 | 3/2006 | Suvanto |
| 2006/0093036 A1 | 5/2006 | Park et al. |
| 2006/0222078 A1 | 10/2006 | Raveendran |
| 2006/0285598 A1 | 12/2006 | Tulkki |
| 2007/0009034 A1 | 1/2007 | Tulkki |
| 2008/0046249 A1 | 2/2008 | Thyssen et al. |
| 2008/0152258 A1 | 6/2008 | Tulkki |
| 2008/0225735 A1 | 9/2008 | Qiu et al. |
| 2009/0021588 A1 | 1/2009 | Border |
| 2009/0067495 A1 | 3/2009 | Au et al. |
| 2009/0271814 A1 | 10/2009 | Bosscha |

FOREIGN PATENT DOCUMENTS

| | | |
|---|---|---|
| EP | 1578226 A1 | 9/2005 |
| FI | 115945 B1 | 8/2005 |
| WO | 9611457 | 5/1998 |
| WO | 0233979 | 4/2002 |
| WO | 02062072 | 8/2002 |
| WO | 02067590 | 8/2002 |
| WO | 02078327 | 10/2002 |
| WO | 03043342 | 5/2003 |

OTHER PUBLICATIONS

Finnish Search Report in Corresponding Application No. 20095273 dated Jan. 8, 2010.

Latecki, Longin Jan; "Image Similarity", Graduate Course: Computer Graphics and Image Processing, Sep. 27, 2004 (XP-002694202), Temple University, Philadelphia, retrieved from the Internet: URL:http://www.cis.temple.edu/~latecki/Courses/CIS601-04/lectures_fall04.htm [retrieved on Mar. 15, 2013], Slides 5-8.

Partial European Search Report in co-pending European Patent Application No. 10156468.0 dated Mar. 21, 2013 (4 pp).

Ferzli, R., et al.; "No-Reference Objective Wavelet Based Noise Immune Image Sharpness Metric", IEEE International Conference on Image Processing, ICIP 2005, IEEE< Piscataway, NJ, USA, vol. 1, Sep. 11, 2005, pp. 405-408.

Extended European Search Report in related matter EP 10156468 dated Jul. 30, 2013.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

Vasudev Bhaskaran et al., "Chapter 6: The MPEG Video Standards", Image and Video Compression Standards—Algorithms & Architectures, Second Edition, 1997, pp. 149-230 Kluwer Academic Publishers.

Vos, Luc De and Stegherr, Michael; "Parameterizable VLSI Architectures for the Full-Search Block-Matching Algorithm", IEEE Transactions on Circuits and Systems, vol. 36, No. 10, Oct. 1989 New York US pp. 1309-1316.

Tsai et al., "Effective Subblock-Based and Pixel-Based Fast Direction Detections for H.264 Intra Prediction" in IEEE Transactions on Circuits and Systems for Video Technology, Vol. 18, No. 7, Jul. 2008.

Tasdizen, et al; "A High Performance Reconfigurable Motion Estimation Hardware Architecture", Design, Automation & Test in Europe Conference & Exhibition, Apr. 20, 2009, IEEE, Piscataway, NJ, US pp. 882-885.

Sunil Kumar Liyang Xu, Mrinal K. Mandal, and Sethuraman Panchanathan, Error Resiliency Schemes in H.264/AVC Standard, Elsevier J. of Visual Communicatio & Image Representation (Special issue on Emerging H.264/AVC Video Coding Standard), vol. 17 (2), Apr. 2006.

Murat A. Tekalp, "Block-based methods", Digital video processing, Prentice Hall Processing Series, Aug. 12, 1995, pp. 98-116, Prentice Hall PTR, "Block-based methods", Digital video processing, Prentice Hall Processing Series, Aug. 12, 1995, pp. 98-116, Prentice Hall PTR.

International Search Report and Written Opinion issued in co-pending PCT International Application No. PCT/US2011/042795 (6pp).

International Search Report dated Feb. 16, 2007, from corresponding PCT application.

Ghanbari Mohammad, "Postprocessing of late calls for Packet Video", IEEE Transactions on Circuits and Systems for Video Technology, vol. 6, No. 6 Dec. 1996, 2010.

* cited by examiner

DIGITAL VIDEO CODING

FIELD

The invention relates to digital video coding.

BACKGROUND

Resolution of digitally encoded videos, such as mobile videos, has increased dramatically, which in turn increases computational demands. Consequently, a video encoder may need help to encode the video sequence properly. Helpful information may include knowledge about the nature of video sequence: global motion, scene changes, and image complexity, for example. Such information, if available, may be used to produce better quality and more constant video. However, video encoders tend to produce constant bit rate video disregarding of complexity changes in the video sequence. For that reason, the quality may vary strongly in real-time video coding. One solution is not to encode the video in real-time, but to analyze the whole video beforehand, or to even encode the video several times in a row. Another way is to feed the helpful information to the encoder while encoding the video.

BRIEF DESCRIPTION

The present invention seeks to provide an improved apparatus, an improved method, and an improved computer program.

According to an aspect of the disclosure, there is provided an apparatus that includes a processor configured to obtain a first digital image and a second digital image, to define at least one block in the first digital image, to define for each block a search area in the second digital image, the search area being larger than the block, to map the block and its search area to an equal size, to calculate pixelwise errors between each block and its search area that are mapped to an equal size, to collect the errors into a memory, and to analyze a three-dimensional surface formed by the errors collected into the memory to locate a pit in the three-dimensional surface, and to define a correspondence between the first digital image and the second digital image by analyzing depth of the pit.

According to another aspect of the disclosure, there is provided an apparatus that includes a processor configured to obtain a first digital image and a second digital image, to define at least one block in the first digital image, to define for each block a search area in the second digital image, the search area being larger than the block, to map the block and its search area to an equal size, to calculate pixelwise errors between each block and its search area that are mapped to an equal size, to collect the errors into memory, and to analyze a three-dimensional surface formed by the errors collected into the memory to locate a pit in the three-dimensional surface, and to define a level of detail in the at least one of the first digital image or the second digital image by analyzing steepness of edges of the pit.

According to another aspect of the disclosure, there is provided an apparatus that includes a processor configured to obtain a first digital image and a second digital image, to define at least one block in the first digital image, to define for each block a search area in the second digital image, the search area being larger than the block, to map the block and its search area to an equal size, to calculate pixelwise errors between each block and its search area that are mapped to an equal size, to collect the errors into a memory, and to analyze a three-dimensional surface formed by the errors collected into the memory to define that a motion between the first digital image and the second digital image extends beyond borders of the first digital image and the second digital image if the analysis of the three-dimensional surface predicts that a pit is outside the borders of the three-dimensional surface.

According to another aspect of the disclosure, there is provided an apparatus that includes a processor configured to obtain a first digital image and a second digital image, to define at least one block in the first digital image, to define for each block a search area in the second digital image, the search area being larger than the block, to map the block and its search area to an equal size, to calculate pixelwise errors between each block and its search area that are mapped to an equal size, to collect the errors into a memory, and to analyze a three-dimensional surface formed by the errors collected into the memory to locate a pit in the three-dimensional surface, and to define a motion blur by analyzing length and direction of the pit as camera movement causing the motion blur.

According to another aspect of the disclosure, there is provided a method that includes obtaining a first digital image and a second digital image; defining at least one block in the first digital image; defining for each block a search area in the second digital image, the search area being larger than the block; mapping the block and its search area to an equal size; calculating pixelwise errors between each block and its search area that are mapped to an equal size; collecting the errors into a memory; analyzing a three-dimensional surface formed by the errors collected into the memory in order to locate a pit in the three-dimensional surface; and defining a correspondence between the first digital image and the second digital image by analyzing depth of the pit.

According to another aspect of the disclosure, there is provided a method that includes obtaining a first digital image and a second digital image; defining at least one block in the first digital image; defining for each block a search area in the second digital image, the search area being larger than the block; mapping the block and its search area to an equal size; calculating pixelwise errors between each block and its search area that are mapped to an equal size; collecting the errors into a memory; analyzing a three-dimensional surface formed by the errors collected into the memory in order to locate a pit in the three-dimensional surface; and defining a level of detail in the at least one of the first digital image and the second digital image by analyzing steepness of edges of the pit.

According to another aspect of the disclosure, there is provided a method that includes obtaining a first digital image and a second digital image; defining at least one block in the first digital image; defining for each block a search area in the second digital image, the search area being larger than the block; mapping the block and its search area to an equal size; calculating pixelwise errors between each block and its search area that are mapped to an equal size; collecting the errors into a memory; and analyzing a three-dimensional surface formed by the errors collected into the memory in order to define that a motion between the first digital image and the second digital image extends beyond borders of the first digital image and the second digital image if the analysis of the three-dimensional surface predicts that a pit is outside the borders of the three-dimensional surface. According to another aspect of the disclosure, there is provided a method that includes obtaining a first digital image and a second digital image; defining at least one block in the first digital image; defining for each block a search area in the second digital image, the search area being larger than the block; mapping the block and its search area to an equal size; calculating pixelwise errors between each block and its search area that are mapped to an equal size; collecting the errors into a memory; analyzing a three-dimensional surface formed by the errors collected into the memory in order to locate a pit in the three-dimensional surface; and defining a motion blur by analyzing length and direction of the pit as camera movement causing the motion blur.

LIST OF DRAWINGS

Embodiments of the present invention are described below, by way of example only, with reference to the accompanying drawings, in which FIG. 1A is an overview of a motion definition method;

DESCRIPTION OF EMBODIMENTS

The following embodiments are exemplary. Although the specification may refer to "an" embodiment in several locations, this does not necessarily mean that each such reference is to the same embodiment, or that the feature only applies to a single embodiment. Single features of different embodiments may also be combined to provide other embodiments.

In order to feed pre-information for the encoder about a coming video sequence, it is necessary to study the sequence beforehand. A global motion vector definition method (U.S. patent application Ser. No. 11/172,972) invented by the Applicant is used to identify the relative locations of the picture frames in a sequence and thus provides excellent means to study the nature of the video to be encoded. This method, unlike the others, is not related to a prior art motion estimation algorithm at all, but introduces a totally new and different approach for global motion vector calculation. Based on the interesting fact about the maps: there is one and only one point on the map that lies over the same spot that it represents, the method utilizes a pair of "maps" taken from consecutive images of a video sequence, for instance: a "map" of a search area and a "map" of a block, whose scales differ from each other, forming the map situation mentioned above. If a map has one and only one pixel that represents the spot where it lies, then, when computing differences between two differently scaled maps, that spot is zero, for the pixel's difference to itself is zero. Even if it is not that simple in reality, because video images not only move but also change, the theory is suitable and efficient when numerous maps are combined.

Figure 1A:
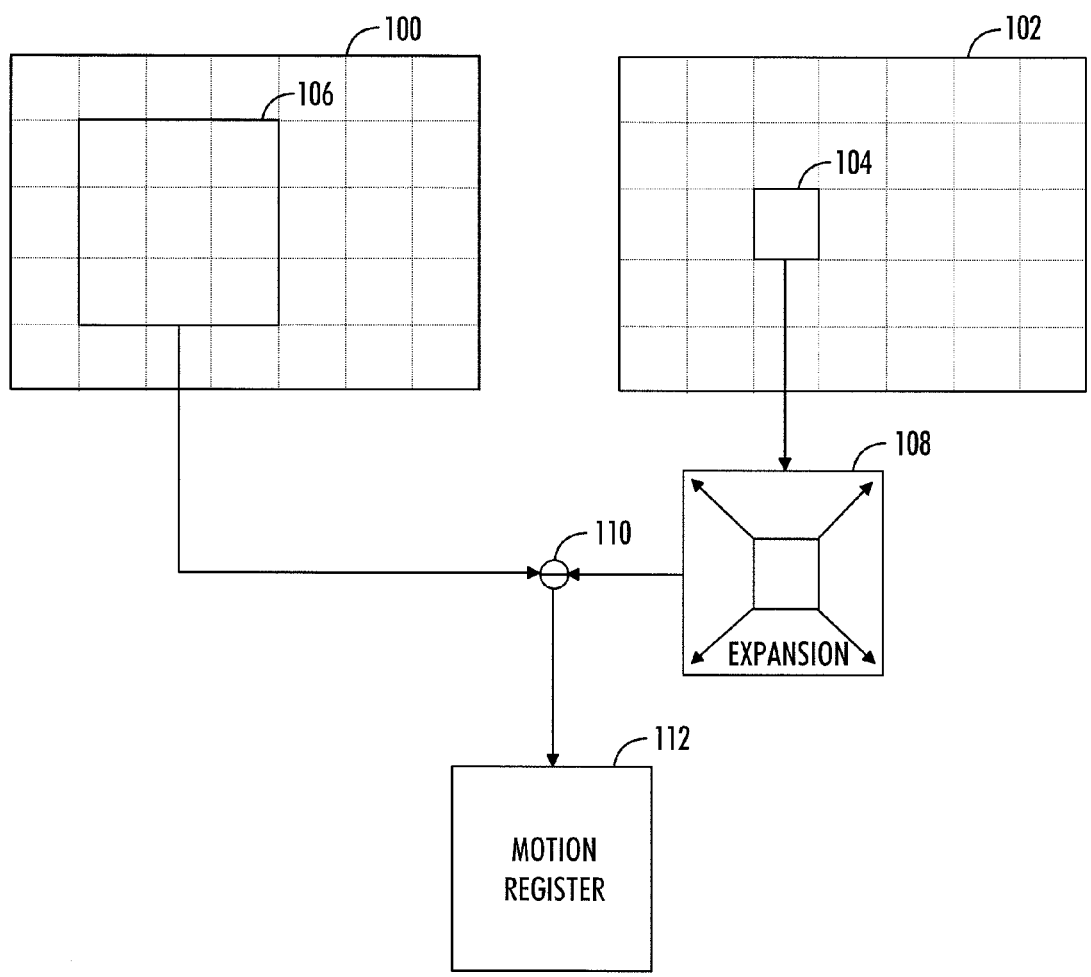
FIG. 1B illustrates the theory of the motion definition method in practice.

FIG. 1A describes an overall simplified scene of the global motion vector definition process: when defining a global motion vector between two consecutive digital images or frames, a previous frame 100 and a present frame 102 on the video sequence, the present image 102 is divided into blocks 104, and for each block 104 a search area 106 wider than the block 104 is defined in the previous image 100. The block 104 is then expanded into the size of the search area 106 forming an "inverse" map 108 of the block 104. "Inverse" here refers to the fact that normally a map is smaller than the area it represents, while in the present case, the map 108 is actually larger than the block 104. After expansion, the algorithm calculates absolute difference values 110 of the related pixels of these two pixel matrices 106 and 108 and arranges them into the motion register 112. After processing every block in image 104, a topographic map of the motion between the frames 100 and 102 is formed into the register 112, where the minimum value shows the desired global motion vector between the frames. For equal-sized images, like 100 and 102, this poses a minor problem: how to deal with the edge blocks of the frame 102 when the search area 106 exceeds the edge of the frame 100? Fortunately, there are several practical solutions: to copy the edge pixels of the frame 100 to fill the search area or to ignore the edge blocks of the frame 102 when the frame 102 is large enough, etc.

It is noteworthy that the present image 102 and the previous image 100 may be in the opposite order: the backward "motion estimation" is then just turned into the forward "motion estimation". On the other hand, the reference image, i.e. the previous image, may also be any other frame for which the global motion vector is to be defined.

Furthermore, it should be noted that the expansion may be virtual, so that the difference calculation process runs the pixels of the block and the search area in different phases. Also, different interpolation methods in block expansion should be taken into account, at least when the search area is not a multiple of the block.

The function between the k×l sized search area S and the expanded block B may be expressed as an error block E:

$$E(i,j)=|B(i,j)-S(i,j)|, \tag{1}$$

where i runs from 0 to k−1 and j runs from 0 to l−1. Moreover, the topographic motion map T that fills the motion register may be expressed as $$T(i, j) = \sum_{i=1}^{n} E_i(i, j), \tag{2}$$

where the frame is divided into n blocks. These blocks can overlap and their union need not cover the entire frame, so feature detection can be applied. Other functions may also be used, such as quadratic functions, which are also efficient in motion estimation algorithms.

Figure 1B:
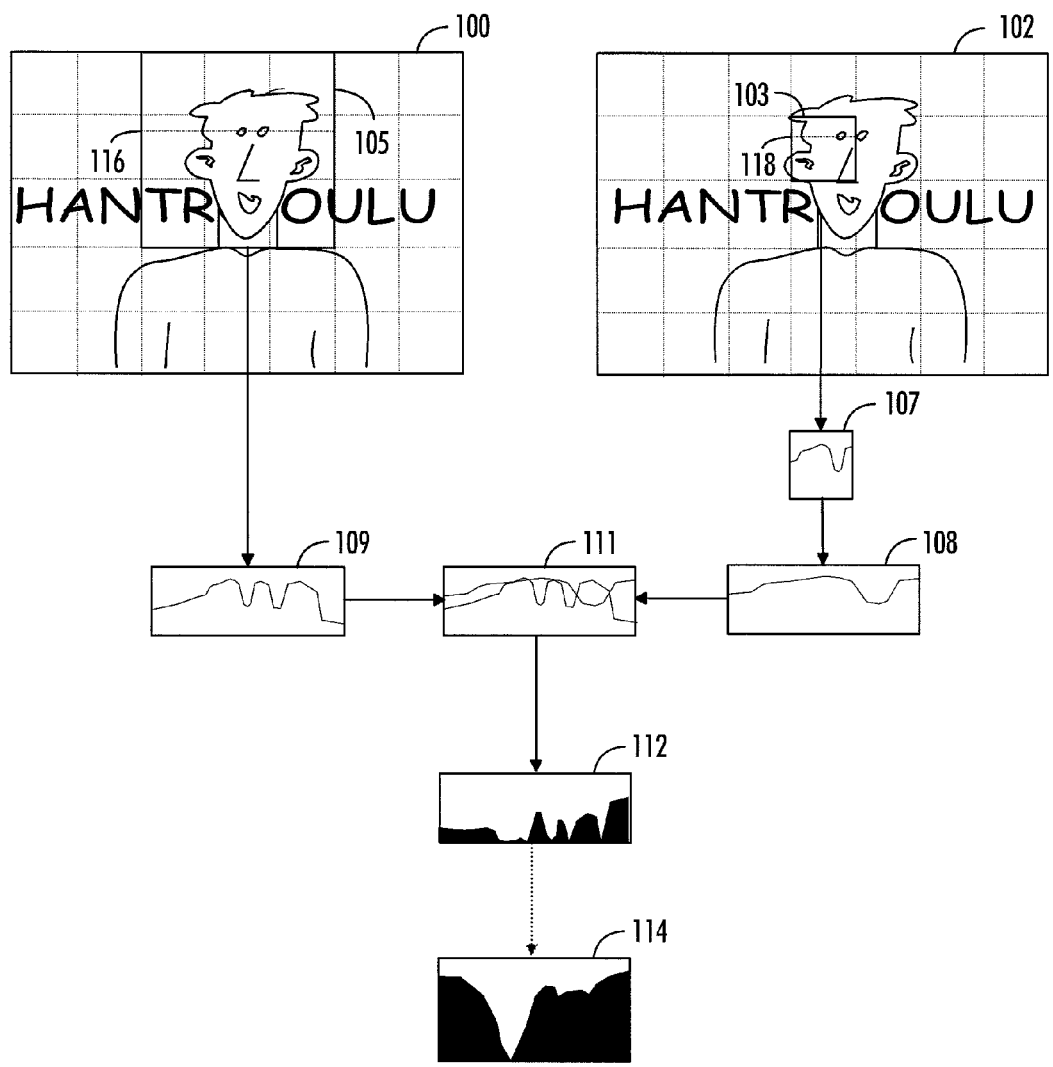

Based on the configuration of FIG. 1A, FIG. 1B illustrates how the previously explained theory works in practice. Again, 102 illustrates a present frame with a person in it and 100 illustrates a previous frame where the person is in a slightly different position. For the sake of clarity, only a cross section 118 of luminance data 107 at the person's eye level is shown, when a block 103 is processed. The corresponding eye-level cross section 116 is selected inside a search area 105, and the cross section 116 of luminance data 109 is shown. The expansion of 107 is shown as 108. These two luminance data elements 108, 109 are combined as 111, where the absolute difference is calculated and added into a motion register 112. The motion register gathers the difference information of every block and search area and the topographic map of motion grows block by block. Finally, after every block is processed, a motion register 114 shows where the global motion vector is. The map of a block does not necessarily show exactly where the global motion vector is, because the map 112 may contain several minimum values, i.e. possible candidates for a motion vector. In the places where the volume of the map grows larger, the possibility for the existence of a motion vector decreases. The motion map 114 is thus a three-dimensional digital surface (that may also be considered a topographic map) of as many elements as there were pixels in the search area of the block. Table 1 gives an example of the topographic map. For the sake of simplicity, actual numeral values have been replaced by symbols, each following symbol marking a certain range of numerical values: ".", ":", "I", "H" and "#". "X" marks the spot for the motion vector.

image around the position of the block. The block is then (virtually) enlarged to the size of the search area and their difference is calculated pixel by pixel in 310, and the difference is then saved in the motion register 312. The loop 306, 308, 310, and 312 repeats until there are no more blocks left 314. In 316, the minimum value is searched from the motion register and a general motion vector is then defined with it. When the general motion vector is known, the motion map analysis 318 follows, which will output useful information of

TABLE 1

A topographic map presented with symbols.

```
I H I I I I I H H H H I I H H # H H H H H H H H H H H H H # # H H
I I I I H I I H H H H I H H H H H H H H H H H H H H H # H H
I I I H H I I H H H H H H H H H H H H H H H H H H H H # # #
I I I I I I I I H H H I H H I H H H I H H H # H H H H H H # # H
I I I I I I : I I I H I I H H I H I I I H H I H H # H H
I I I I I I I I I I H H I H H H I I I I H H H H I H H H H H H
I I I : : I I I : I I I I H H H I I : I I H H I H I I H H H H H H
I I I : : : I I I I I I I I I : : . . : : I : I I : : I I H H I I
: : : : : . . : I I : I I : I I I : : . : : : : : I I : : I I I H I I
: : I I I : I I I I I I I I I I I I I I I I H I I I H H # # H I
I I I : : : . . : I I I I : I I : : I I I I : I I I H H H H I H
: : : I : I I : : I I I I : I : I : : : I I I I : : : I I H H I H
: : : : : . . : I : I I : I I I : : . : : : : : I : : : I I H H I I
: : : : : . . : . . : . . : . . . . . : : . : : : : : I I I H I I
I I I : . . : : I : : . . : : . : . : . : : I I I I I I
: : : : : : I I : : : : : : : : . . : : . . : I I I I I I I
: : : : : . . : . . : . X . . . . : I : : : I I H H H I I
H I : I I : : I I : : . : . . : : : : : : I I H H H # H H
H H I I I I I I I I : : : : : : : : : I I I I H H # # # #
I I I : : I I : : . . . . : : : : : I I I : I H H H H H
I : : : : . . : . . : . . : . . . : I H I I : : H H H H H H
I : I H H I : I I I I I I I I H H I I I I H H H H H I H # # H H
I I I I I I I I I I I I I I I I I I H H I H H H H H H H # # #
I H I I I I H H H I I I H H H H I I I I H H H I H H # # # # H #
I I I I H H H H I I H H H H H H H H H H I I I H H H H H H # # #
H H H H H # H H H H H H H H H H H H H H H # H # # # # # # # #
H H H H H H H H H H H H H H H H H H H # # H H H # # # # # # #
H I I I H H I H I H H # # H H H H # # H # # H H # H H # # # # # #
I I I I H I I H H H H # # # # # # # # # # # # # # # # # # # #
H H H H H H # # # # # # # # # # # # H H # # # # # # # # # # #
H H H H H H # H H # H # # # H H # # H # H H # # # # # # # # #
# H H H H # H # # # # # # # # H # # # # # # # # # # # # # #
H H H H # # # # # # # # # # # # # # # # # # # # # # # # # #
```

Figure 2:
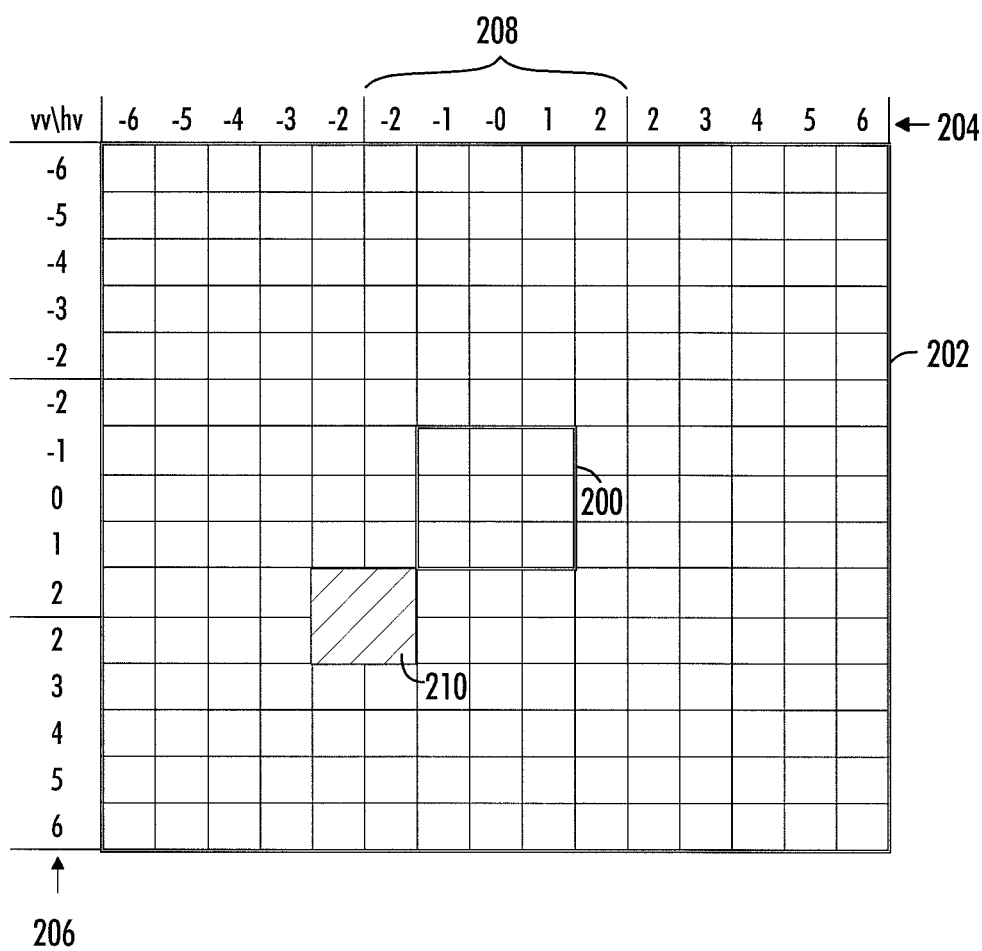
FIG. 2 is a table illustrating the relation between a motion map and motion vectors.

FIG. 2 shows the connection between the topographic map in the motion register and motion vectors as a chart. The block size 200 is 3×3 pixels and the search area 202 is 15×15 pixels. What is noteworthy here, is the periodic character of the motion vectors, which is shown in the edges of the chart: top values 204 stand for horizontal motion vectors and left values 206 stand for vertical motion vectors. The length of the motion vector period 208 is the rate between the sizes of the block and the search area. Here, the period is 5=15/3. This means that there will be repeating values in the topographic map. For example, there is an area of four values 210 that all point to the same vector (2, −2). This can be eliminated by combining all four values into their mean value while filling the map or afterwards, for example. The location of the map's minimum value shows the motion vector, which can easily be read from the chart's edge values, or calculated in an application.

Figure 3:
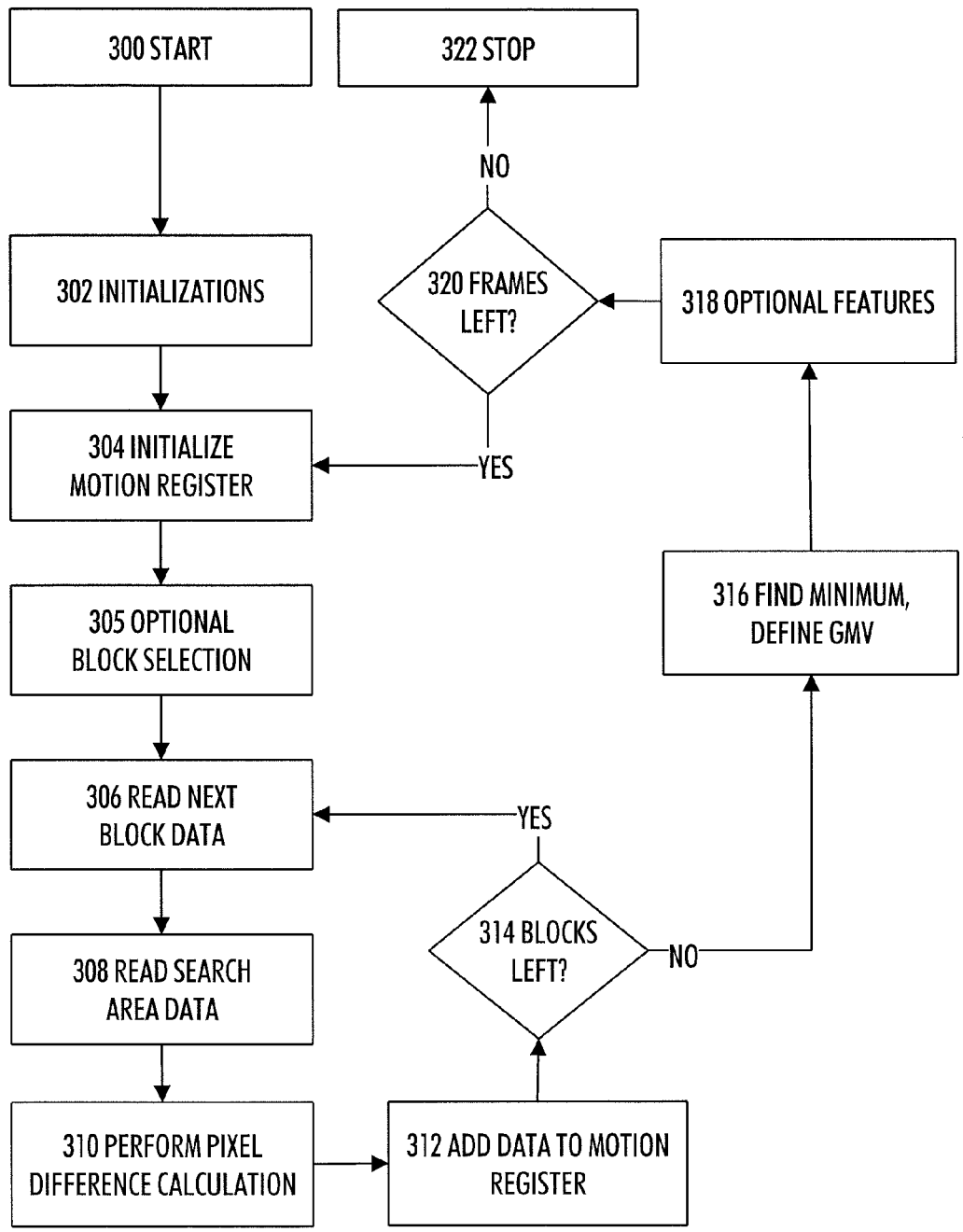
FIG. 3 is a flow diagram illustrating the motion definition method.

In the following, with reference to the flow chart shown in FIG. 3, a method for creating the motion map and performing the image analysis between two images is described. The method starts from 300. In 302, initializations are made; they may contain definitions for block size, search area size, etc. Next, in 304 the register for motion map is initialized to neutral. An optional block selection may be carried out in 305, with feature or detail detection, for example. In 306, the block data is read. The block data may be in luminance, chrominances Cb or Cr, red, blue, or in whatever digital colour format. In 308, the search area data is read from the other the video sequence for the encoding. The method loops frame pairs until there are no more frames left 320, whereupon the method is stopped in 322.

Figure 7:
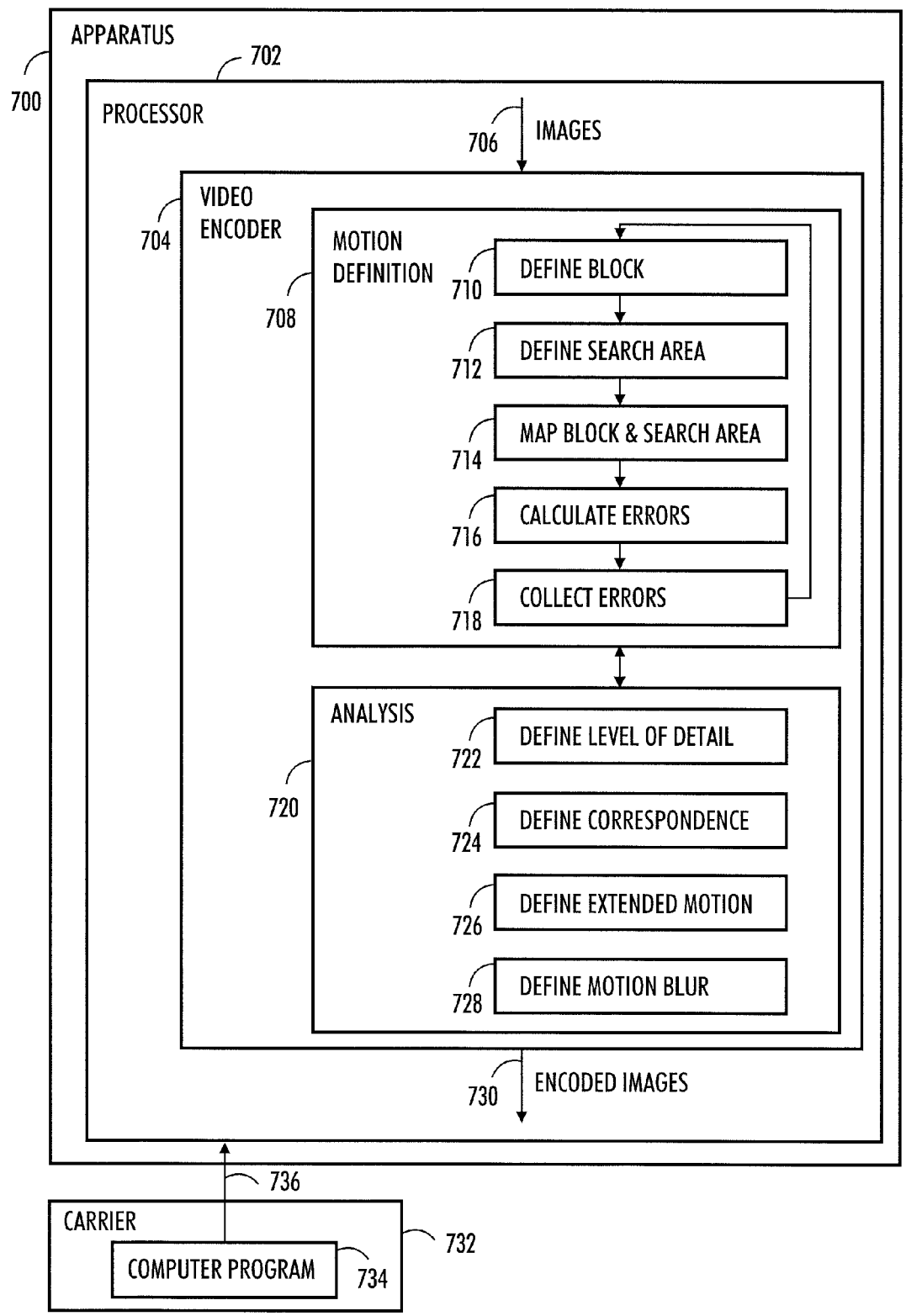
FIG. 7 illustrates an apparatus.

FIG. 7 illustrates an apparatus 700. The apparatus may be a (part of a) digital image processing apparatus, and thus comprise a video encoder 704 producing encoded images 730. The video encoder may operate according to a video compression standard. Such apparatuses include various subscriber terminals, user equipment, and other similar portable equipment, with or without a digital camera. However, the apparatus 700 is not limited to these examples, but it may be embedded in any electronic equipment where the described analysis may be implemented. The subscriber terminal may refer to a portable computing device. Such computing devices include wireless mobile communication devices operating with or without a subscriber identification module (SIM), including, but not limited to, the following types of devices: mobile phone, smartphone, personal digital assistant (PDA), handset. A wireless connection may be implemented with a wireless transceiver operating according to the GSM (Global System for Mobile Communications), WCDMA (Wideband Code Division Multiple Access), WLAN (Wireless Local Area Network) or Bluetooth® standard, or any other suitable standard/non-standard wireless communication means.

The apparatus 700 comprises a processor 702. The term 'processor' refers to a device that is capable of processing data. The processor 702 may comprise an electronic circuit implementing the required functionality, and/or a microprocessor running a computer program implementing the required functionality. When designing the implementation, a person skilled in the art will consider the requirements set for the size and power consumption of the apparatus, the necessary processing capacity, production costs, and production volumes, for example.

The electronic circuit may comprise logic components, standard integrated circuits, application-specific integrated circuits (ASIC), and/or other suitable electronic structures.

The microprocessor implements functions of a central processing unit (CPU) on an integrated circuit. The CPU is a logic machine executing a computer program, which comprises program instructions. The program instructions may be coded as a computer program using a programming language, which may be a high-level programming language, such as C, or Java, or a low-level programming language, such as a machine language, or an assembler. The CPU may comprise a set of registers, an arithmetic logic unit (ALU), and a control unit. The control unit is controlled by a sequence of program instructions transferred to the CPU from a program memory. The control unit may contain a number of microinstructions for basic operations. The implementation of the microinstructions may vary, depending on the CPU design. The microprocessor may also have an operating system (a dedicated operating system of an embedded system, or a real-time operating system), which may provide system services to the computer program.

Figure 8:
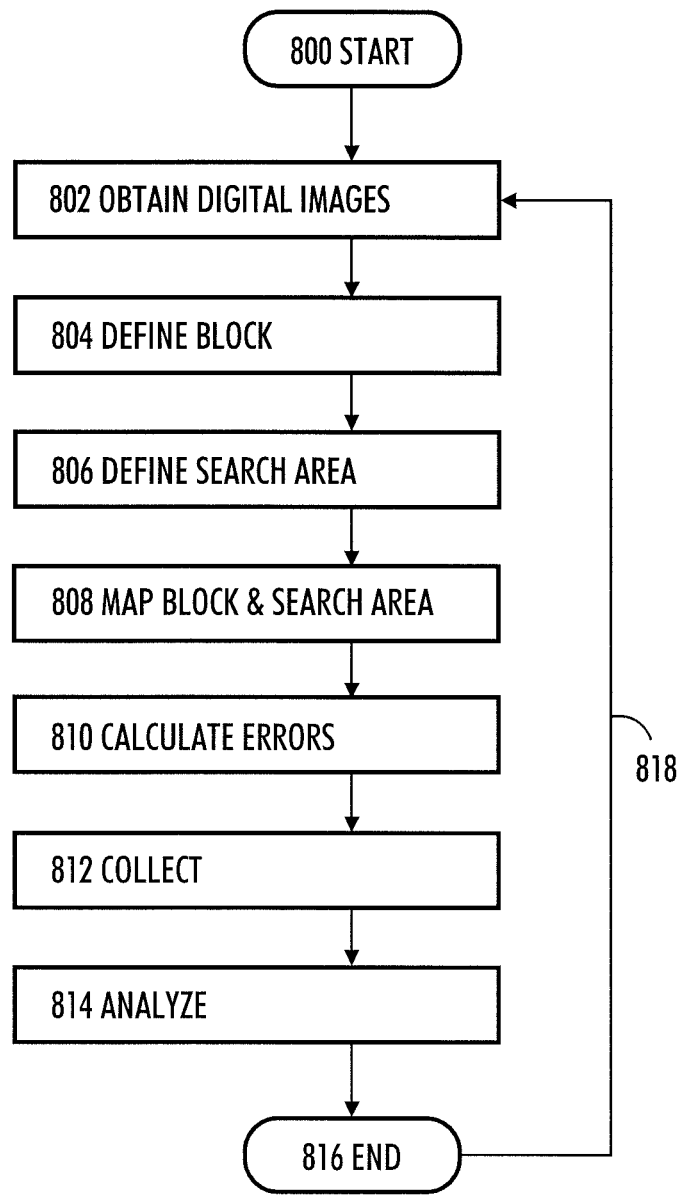
FIG. 8 illustrates a method.

An embodiment provides a computer program 734 comprising program instructions which, when loaded into an apparatus, cause the apparatus to implement the functionality of the processor 702 which is next described, or to perform the process illustrated later in FIG. 8. The computer program 734 may be run on the processor 702. The computer program 734 may be in source code form, object code form, or in some intermediate form, and it may be stored in a carrier, which may be any entity or device capable of carrying 736 the program to the apparatus 700. The carrier 732 may be implemented as follows, for example: the computer program 734 may be embodied on a record medium, stored in a computer memory, embodied in a read-only memory, carried on an electrical carrier signal, carried on a telecommunications signal, and/or embodied on a software distribution medium.

The processor 702 is configured to obtain a first digital image and a second digital image 706, to define 710 at least one block in the first digital image, to define 712 for each block a search area in the second digital image, the search area being larger than the block, to map 714 the block and its search area to an equal size, to calculate 716 pixelwise errors between each block and its search area that are mapped to an equal size, and to collect 718 the errors into a memory. These functions may be implemented inside a motion definition block 708 of the video encoder 704.

The processor 702 is also configured to analyze a three-dimensional surface formed by the errors collected into the memory in order to define a level of detail 722 in the first digital image and/or in the second digital image, and/or a correspondence 724 between the first digital image and the second digital image, and/or a motion 726 extending beyond borders of the first digital image and the second digital image, and/or a motion blur 728 within the first digital image and/or within the second digital image. These functions may be implemented within an analysis block 720 interacting with the motion definition block 708, i.e. analysis is based on the motion definition, but the analysis may also affect the motion definition block 708, or the video encoder 704 in general.

In an embodiment, the processor 702 is configured to locate a pit in the three-dimensional surface, and to define the correspondence between the first digital image and the second digital image by analyzing depth of the pit.

Figure 4A:
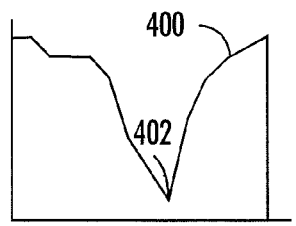
FIGS. 4A, 4B and 4C illustrate cross-sections of motion maps.
Figure 4B:
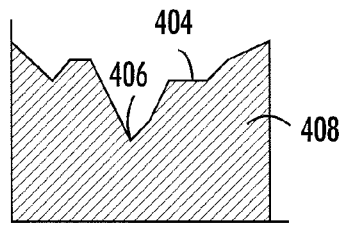
Figure 4C:
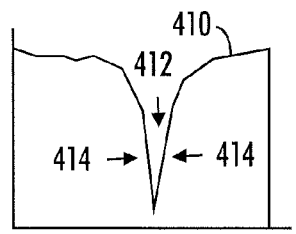

FIGS. 4A, 4B and 4C demonstrate the cross-section of the three-dimensional surface in the motion map and the features to be measured. Cross-sections, rather than the actual three-dimensional surfaces, are used in order to simplify and clarify the illustrations.

In FIG. 4A, a surface 400 forms a pit 402. While the surface is constructed from the error values of every possible motion vector, the depth of the pit 402 reveals clearly the way the minimum value (=the bottom of the pit) differs from other error values. When the minimum value equals zero, it indicates that the images are identical producing zero error with the motion vector attached to the value. Generally, the depth of the pit indicates how well the images correspond to each other. The depth may be measured for example by comparing the minimum value to the average value of errors. Let us call it a variable C (comparability). Variable C may also be scaled into a constant range, for instance into percentages 0 to 100, where 0 indicates "no detected comparability" and 100 indicates "full comparability".

In an embodiment illustrated in FIG. 4B, the processor 702 is configured to define the level of detail in the first digital image and the second digital image by analyzing volume outlined by the three-dimensional surface. There is a cross section of a motion map surface 404 showing another pit 406. As the map is constructed from the error elements of all motion vectors, the volume 408 of the map may describe the overall difference between images. The volume 408 may be called a variable L (load). The load may be measured simply by summing up all the error elements, taking an average of them, or by some other simple statistical method. One suitable way is to count $\Sigma(x_i - min)$ over all the error values $x_i$ to represent the difference. Some special features between compared images may be concluded from the load. If the load is zero, the images are identical but totally flat as well.

In an embodiment, the processor 702 is configured to locate a pit in the three-dimensional surface, and to define the level of detail in the first digital image and/or in the second digital image by analyzing steepness of edges of the pit. In FIG. 4C, slopes 414 of a pit 412 on a surface 410 are shown. While the minimum value (=the bottom of the pit) of the surface 410 is the error value of the best motion vector, its neighbours are naturally the error values of the neighbour vectors. Consequently, the slopes 414 may reveal how detailed, or actually "sharp" the images are. If the pit 412 is narrow and deep, the images may be considered to be sharp and detailed, while the images with wide and low pit are probably soft with less details.

Another aspect besides the images is the motion in them. In an embodiment, the processor 702 is configured to define that a motion between the first digital image and the second digital image extends beyond borders of the first digital image and the second digital image if the analysis of the three-dimensional surface predicts that a pit is outside the borders of the three-dimensional surface. If the minimum value is on the edge of the map, the motion is probably longer than the search area. Depending on the motion vector length of the encoder, the encoder may not be able to encode it properly as inter coding.

Figure 5:
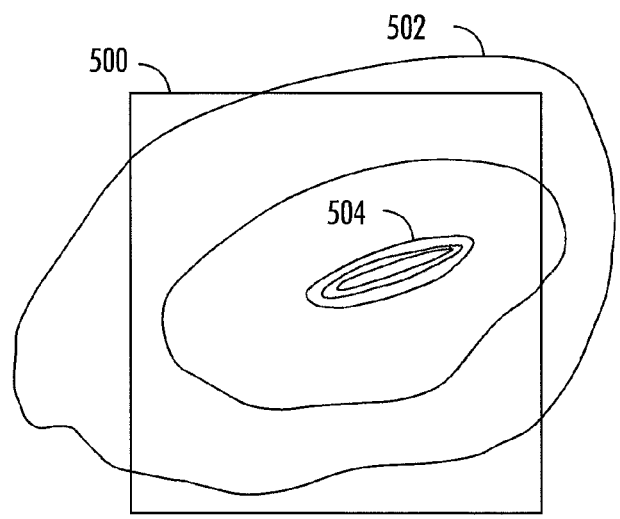
FIG. 5 illustrates a motion map as a topographic map.

In an embodiment, the processor 702 is configured to locate a pit in the three-dimensional surface, and to define the motion blur by analyzing length and direction of the pit as camera movement causing the motion blur. FIG. 5 shows the motion register 500 as a topographic map where the contour lines 502 shows a certain range of error values. When the pit becomes distinctively longish and thin, it is a mark of a motion caused blurring. The measurement of length and direction of camera motion that has caused the blurring is a big problem in motion deblurring. As the image softens in the direction and length of camera motion when motion blurring appears, it may be revealed by comparing the image into itself and taking the motion map of a single image. The length and direction of the pit 504 is measured to define the motion blur.

FIGS. 6A, 6B, 6C, 6D, 6E and 6F represent some extreme examples in relation to images and the form of the motion map surface.

Figure 6A:
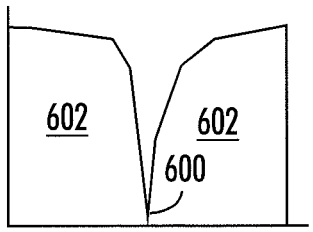
FIGS. 6A, 6B, 6C, 6D, 6E and 6F illustrate interpretation of motion maps.

In FIG. 6A, a load 602 is high and a pit 600 is deep and narrow reaching the zero value at minimum. This clearly reveals that the two images are alike and they are full of sharp details.

Figure 6B:
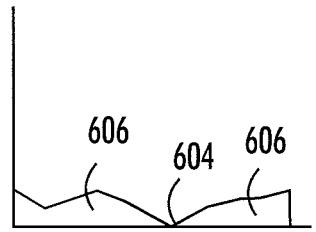

In FIG. 6B, a minimum 604 is also zero but this time a load 606 is low and a pit is wide. So the images are alike, but now they are soft and smooth with less details.

Figure 6C:
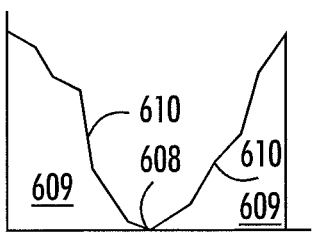

In FIG. 6C, a load 609 has grown, a minimum 608 is still zero and slopes 610 are gentle. This reveals similar images with some smooth details.

Figure 6D:
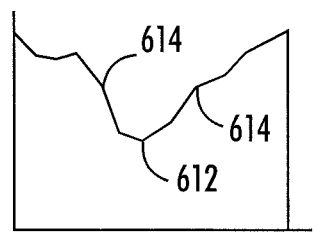

FIG. 6D represents a surface with gentle slopes 614 and a relatively high minimum 612. This indicates smooth images with some similarities.

Figure 6E:
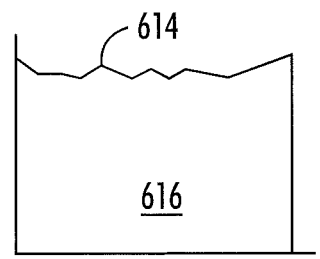

FIG. 6E represents a situation of two quite different images, because a surface 614 has no pit and a load 616 is high.

Figure 6F:
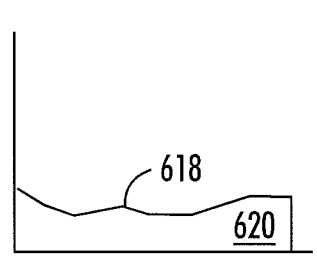

In FIG. 6F, the situation is the same as in 6E but a surface 618 has a smaller load 620. It suggests two dissimilar and flat images with quite similar brightness.

It is notable that the measurements are performed between two images, so they do not show the absolute values of an image, but rather a guideline or a change in a sequence. To observe the absolute values of complexity (sharpness and detail), for example, a tracker can be added where a complexity information of change is added to the existing value. One needs only to keep track of consecutive values. It is also notable that the final factors, to be used for example in a video encoder, may be concluded from the measurements in many ways. For instance, the complexity factor may be a function of a slope and a load.

Next, a method will be described with reference to FIG. 8. The method relates to digital video analysis. The method starts in 800.

In 802, a first digital image and a second digital image are obtained.

In 804, at least one block is defined in the first digital image.

In 806, a search area in the second digital image is defined for each block, the search area being larger than the block.

In 808, the block and its search area are mapped to an equal size.

In 810, errors are calculated pixelwise between each block and its search area that are mapped to an equal size.

In 812, the errors are collected into a memory.

In 814, a three-dimensional surface formed by the errors collected into the memory is analyzed in order to define a level of detail in the first digital image and/or in the second digital image, and/or a correspondence between the first digital image and the second digital image, and/or a motion extending beyond borders of the first digital image and the second digital image, and/or a motion blur within the first digital image and/or within the second digital image.

The method ends in 816, or, as illustrated by the reference numeral 818, the operations may be performed recursively.

It should be noted that no special order of operations is required in the method, except where necessary due to the logical requirements for the processing order.

The formerly described details of the apparatus 700 may be applied to the method as well.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising a processor configured
to obtain a first digital image and a second digital image,
to define at least one block in the first digital image,
to define for each block a search area in the second digital image, the search area being larger than the block,
to map the block and its search area to an equal size,
to calculate pixelwise errors between each block and its search area that are mapped to an equal size,
to collect the errors into a memory, and
to analyze a three-dimensional surface formed by the errors collected into the memory to locate a pit in the three-dimensional surface, and to define a correspondence between the first digital image and the second digital image by analyzing depth of the pit.

2. An apparatus comprising a processor configured
to obtain a first digital image and a second digital image,
to define at least one block in the first digital image,
to define for each block a search area in the second digital image, the search area being larger than the block,
to map the block and its search area to an equal size,
to calculate pixelwise errors between each block and its search area that are mapped to an equal size,
to collect the errors into a memory, and
to analyze a three-dimensional surface formed by the errors collected into the memory to locate a pit in the three-dimensional surface, and to define a level of detail in the at least one of the first digital image or the second digital image by analyzing steepness of edges of the pit.

3. An apparatus comprising a processor configured
to obtain a first digital image and a second digital image,
to define at least one block in the first digital image,
to define for each block a search area in the second digital image, the search area being larger than the block,
to map the block and its search area to an equal size,
to calculate pixelwise errors between each block and its search area that are mapped to an equal size,
to collect the errors into a memory, and
to analyze a three-dimensional surface formed by the errors collected into the memory to define that a motion between the first digital image and the second digital image extends beyond borders of the first digital image and the second digital image if the analysis of the three-dimensional surface predicts that a pit is outside the borders of the three-dimensional surface.

4. An apparatus comprising a processor configured
to obtain a first digital image and a second digital image,
to define at least one block in the first digital image,
to define for each block a search area in the second digital image, the search area being larger than the block,
to map the block and its search area to an equal size,
to calculate pixelwise errors between each block and its search area that are mapped to an equal size,
to collect the errors into a memory, and
to analyze a three-dimensional surface formed by the errors collected into the memory to locate a pit in the three-dimensional surface, and to define a motion blur by analyzing length and direction of the pit as camera movement causing the motion blur.

5. A method comprising:
obtaining a first digital image and a second digital image;
defining at least one block in the first digital image;
defining for each block a search area in the second digital image, the search area being larger than the block;
mapping the block and its search area to an equal size;
calculating pixelwise errors between each block and its search area that are mapped to an equal size;
collecting the errors into a memory;
analyzing a three-dimensional surface formed by the errors collected into the memory in order to locate a pit in the three-dimensional surface; and
defining a correspondence between the first digital image and the second digital image by analyzing depth of the pit.

6. A method comprising:
obtaining a first digital image and a second digital image;
defining at least one block in the first digital image;
defining for each block a search area in the second digital image, the search area being larger than the block;
mapping the block and its search area to an equal size;
calculating pixelwise errors between each block and its search area that are mapped to an equal size;
collecting the errors into a memory;
analyzing a three-dimensional surface formed by the errors collected into the memory in order to locate a pit in the three-dimensional surface; and
defining a level of detail in the at least one of the first digital image and the second digital image by analyzing steepness of edges of the pit.

7. A method comprising:
obtaining a first digital image and a second digital image;
defining at least one block in the first digital image;
defining for each block a search area in the second digital image, the search area being larger than the block;
mapping the block and its search area to an equal size;
calculating pixelwise errors between each block and its search area that are mapped to an equal size;
collecting the errors into a memory; and
analyzing a three-dimensional surface formed by the errors collected into the memory in order to define that a motion between the first digital image and the second digital image extends beyond borders of the first digital image and the second digital image if the analysis of the three-dimensional surface predicts that a pit is outside the borders of the three-dimensional surface.

8. A method comprising:
obtaining a first digital image and a second digital image;
defining at least one block in the first digital image;
defining for each block a search area in the second digital image, the search area being larger than the block;
mapping the block and its search area to an equal size;
calculating pixelwise errors between each block and its search area that are mapped to an equal size;
collecting the errors into a memory;
analyzing a three-dimensional surface formed by the errors collected into the memory in order to locate a pit in the three-dimensional surface; and
defining a motion blur by analyzing length and direction of the pit as camera movement causing the motion blur.

* * * * *